United States Patent [19]

Naoi

[11] Patent Number: 5,759,587
[45] Date of Patent: Jun. 2, 1998

[54] TIRE PRESS

[75] Inventor: Masaki Naoi, Takasago, Japan

[73] Assignee: Kabushiki Kaisha Kobe Seiko Sho, Kobe, Japan

[21] Appl. No.: 714,794

[22] Filed: Sep. 13, 1996

[30] Foreign Application Priority Data

Sep. 14, 1995 [JP] Japan ................. 7-236944

[51] Int. Cl.$^6$ ................. B29C 35/02
[52] U.S. Cl. ................. 425/40; 425/43; 425/47
[58] Field of Search ................. 425/34.1, 40, 43, 425/47

[56] References Cited

U.S. PATENT DOCUMENTS

| | | |
|---|---|---|
| 4,212,605 | 7/1980 | MacMillan ................. 425/47 |
| 4,453,902 | 6/1984 | Imbert ................. 425/47 |
| 4,686,129 | 8/1987 | Yokoyama et al. ................. 425/47 |
| 4,927,344 | 5/1990 | Amano et al. ................. 425/47 |
| 5,316,458 | 5/1994 | Lesneski ................. 425/47 |

*Primary Examiner*—James P. Mackey
*Attorney, Agent, or Firm*—Oblon, Spivak, McClelland, Maier & Neustadt, P.C.

[57] ABSTRACT

Disclosed is a tire press used for manufacturing a tire, in which a mechanism for clamping a closed mold is simplified. An upper heating unit for heating an upper-half mold has a cylinder structure in which a heating medium receiving member and a movable heat transfer member are provided. By supplying the heating medium to the heating medium receiving member, the upper-half mold can be heated via the movable heat transfer member, and the pressure from (clamping action) can be applied on the upper-half mold by the movable heat transfer member.

4 Claims, 2 Drawing Sheets

TIRE PRESS

BACKGROUND OF THE INVENTION

The present invention relates to a tire press.

At the last stage of manufacturing a tire, there is a process for vulcanizing a green tire, which has been made in a tire shape by sticking various rubber parts, by a tire press. The tire press used in the process has: a mold having an upper-half mold and a lower-half mold, which has therein a cavity in which a green tire is vulcanized when the mold is closed; a mechanism of opening and closing the mold by lifting the upper-half mold; upper and lower heating units which come into contact with the upper-half and lower-half molds when the mold is closed; and a mechanism of clamping the mold.

The tire press of this kind has, broadly speaking, two types. One is a mechanical type in which a crank mechanism, a ball screw mechanism, or the like is used as the mechanism of opening and closing molds. The other is a fluid pressure type in which a fluid pressure cylinder is used.

The mechanism of opening and closing molds of the mechanical type usually has a structure such that a beam portion or the like from which the upper mold is suspended is slightly deflected (elastic deformation) by bringing the beam portion down after the mold is closed, thereby obtaining the clamping force. That is, the opening/closing mechanism also serves as the clamping mechanism of the mold.

In the mechanism of opening and closing the molds of the fluid pressure type, generally, in addition to a fluid pressure cylinder for lifting the upper mold, another fluid pressure cylinder that is exclusively used for the clamping mechanism is used. There are various fluid pressure cylinders for clamping the molds such as one that is mounted to lift the lower mold which is closed with the upper mold (JP-A-57-203534) and one that is mounted to bringing down the upper mold which is closed with the lower mold (JP-B-1-24049).

There is the tire press having the mechanism of opening and closing the molds of the mechanical type, separately has the clamping mechanism using the fluid pressure cylinder (JA-B-1-24050).

Since the tire press has the opening/closing mechanism of the molds that also serves as the clamping mechanism (usually, of the mechanical type), it is imagined that the structure is accordingly simplified. The truth is that, since the beam portion or the like from which the upper-half mold is suspended is deflected, the structure in the peripheral portion has to be strengthened. The tire press is, therefore, large in size and heavy in weight. Since the deflection of the beam portion or the like is not constant, there are drawbacks such that the clamping force is not applied evenly on the surface of the upper-half mold and that there is variation in the clamping force every operation.

The tire press in which the clamping mechanism is provided separately from the mold opening/closing mechanism (typically, of a fluid pressure type) does not have the above various drawbacks. However, the fluid pressure cylinders are necessary not only for the mold opening/closing mechanism but also for the clamping mechanism, so that there are drawbacks such that the number of cylinders required in the whole apparatus is large and that equipment such as piping for the cylinders and a structure of controlling the valves is complicated and large in size.

SUMMARY OF THE INVENTION

In view of the above drawbacks, it is an object of the invention to provide a tire press in which the structure is simplified and a mold is closed firmly and evenly.

According to the invention, the object is achieved by a tire press comprising: a mold comprising an upper-half mold and a lower-half mold, which has therein a vulcanization cavity in which a green tire is vulcanized when the mold is closed; a mold opening/closing mechanism which lifts the upper-half mold; and upper and lower heating units which come into contact with the upper-half and lower-half molds, respectively, when the mold is closed. In such a tire press, at least one of the heating units has a heating medium receiving member and a movable heat transfer member that presses the upper-half or lower-half mold when the mold is closed.

The upper-half or lower-half mold is heated via the upper or lower heating unit, so that the green tire, which is loaded into the vulcanization cavity of the mold, is vulcanized. As mentioned above, either the upper heating unit or the lower heating unit has a cylinder structure comprising the heating medium receiving member and the movable heat transfer member.

When the heating medium such as steam or the like is supplied to the heating medium receiving member, a force to press the movable heat transfer member to be projected from the heating medium receiving unit takes place. Since the upper-half or lower-half mold is pressed to clamp the mold by using the pressure force, the mold can be evenly clamped. Needless to say, the heating unit heats the upper or lower mole via the movable heat transfer member with the heating medium that is supplied to the heating medium receiving member.

In a typical tire press, a (flexible bag-shaped) bladder is inserted into the green tire that is loaded in the vulcanization cavity when the upper and lower molds are closed, and the green tire is expanded to the tire shape by being filled with a pressure fluid at high temperature (steam or the like). The green tire is also heated from the inside.

The heating medium is supplied from a branch of the fluid source that is used for the bladder to the heating medium receiving member of the heating unit which has the movable heat transfer member.

With such a structure, the piping that is used to make the movable heat transfer member press the mold is not separately needed. Thus, the piping structure of the whole tire press can be extremely simplified. There is also an advantage such that only one fluid source is necessary.

Preferably, in the heating unit having the movable heat transfer member, the heat transfer member is movable by a vertical stroke permitting a change in the height of the mold with respect to the heating medium receiving member.

When the vertical stroke of the movable heat transfer member is enlarged, the change in the height of the mold can be coped with when the upper-half and lower-half molds are replaced by those having different height. That is, the mechanism of adjusting the height of the upper-half and lower-half molds in order to change the height of the closed mold is unnecessary in the tire press. The working time for operating the height adjusting mechanism can be saved. Therefore, the structure is further simplified and the working time is shortened.

Preferably, the upper heating unit is used as a heating unit having the movable heat transfer member.

Since the lower heating unit has a center mechanism of supplying and discharging of the pressure fluid to/from the bladder and of vertically moving the bladder, it is very advantageous when the upper heating unit has the movable heat transfer member thereby avoiding complication of the structure of the lower heating units and the peripheral portion of the bladder.

DETAILED DESCRIPTION OF THE PREFERRED EMBODIMENT

An embodiment of the invention will be described hereinbelow with reference to the drawings.

Figure 1:
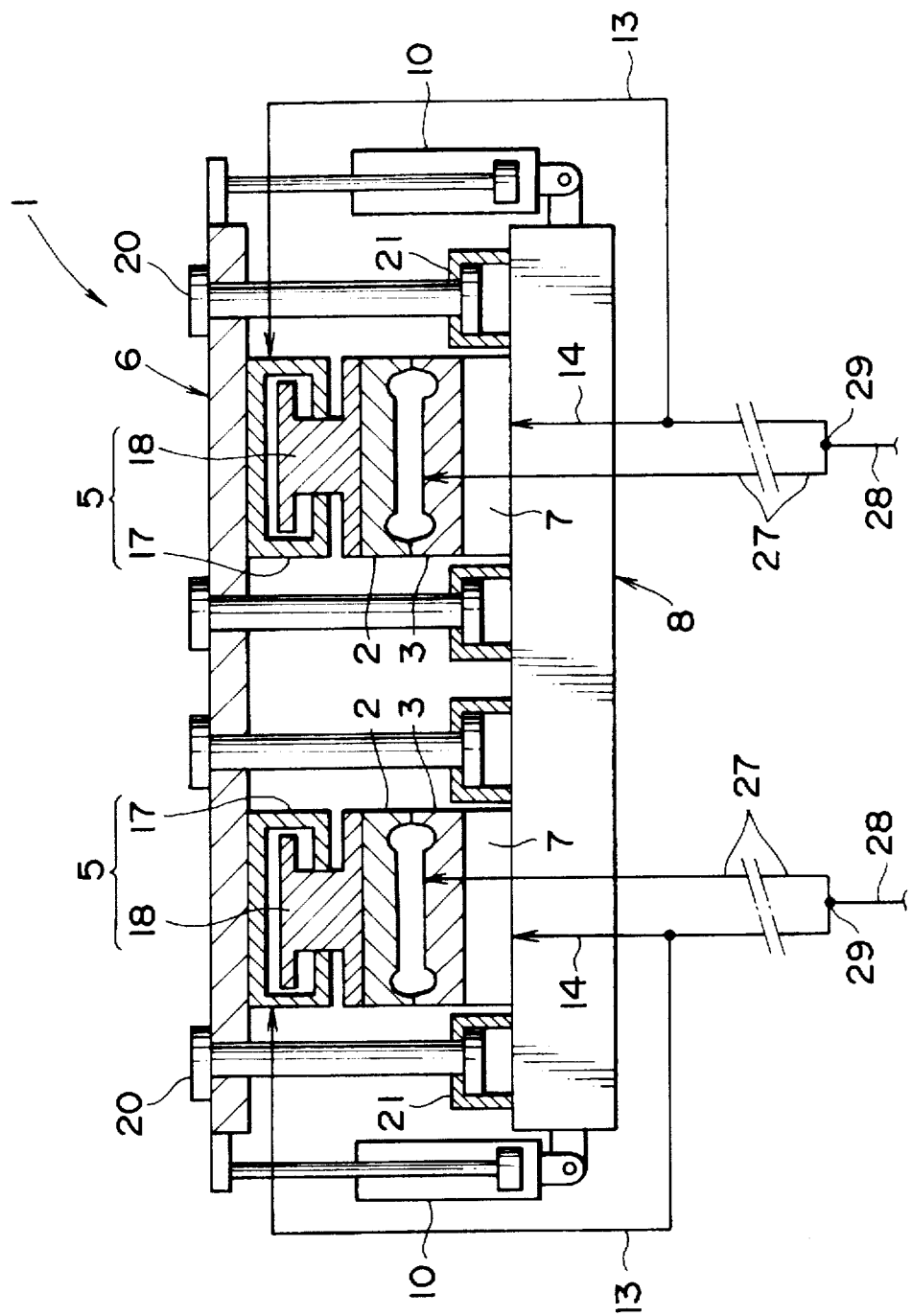
FIG. 1 is a side elevation view schematically showing a tire press according to an embodiment of the invention.

FIG. 1 shows a tire press 1 according to an embodiment of the invention. The tire press 1 is of a twin type in which two tires are vulcanized at once. It has a pair of molds. Each mold is constructed by an upper-half mold 2 and a lower-half mold 3.

The upper-half mold 2 is suspended from a top slide 6 via an upper heating unit 5. The upper-half mold 3 is fixed to a base frame 8 via a lower heating unit 7.

The top slide 6 can vertically move with respect to the base frame 8 by a mold opening/closing mechanism 10 which uses a fluid pressure cylinder, thereby indirectly moving the upper-half mold 2 in the vertical direction.

Figure 2:
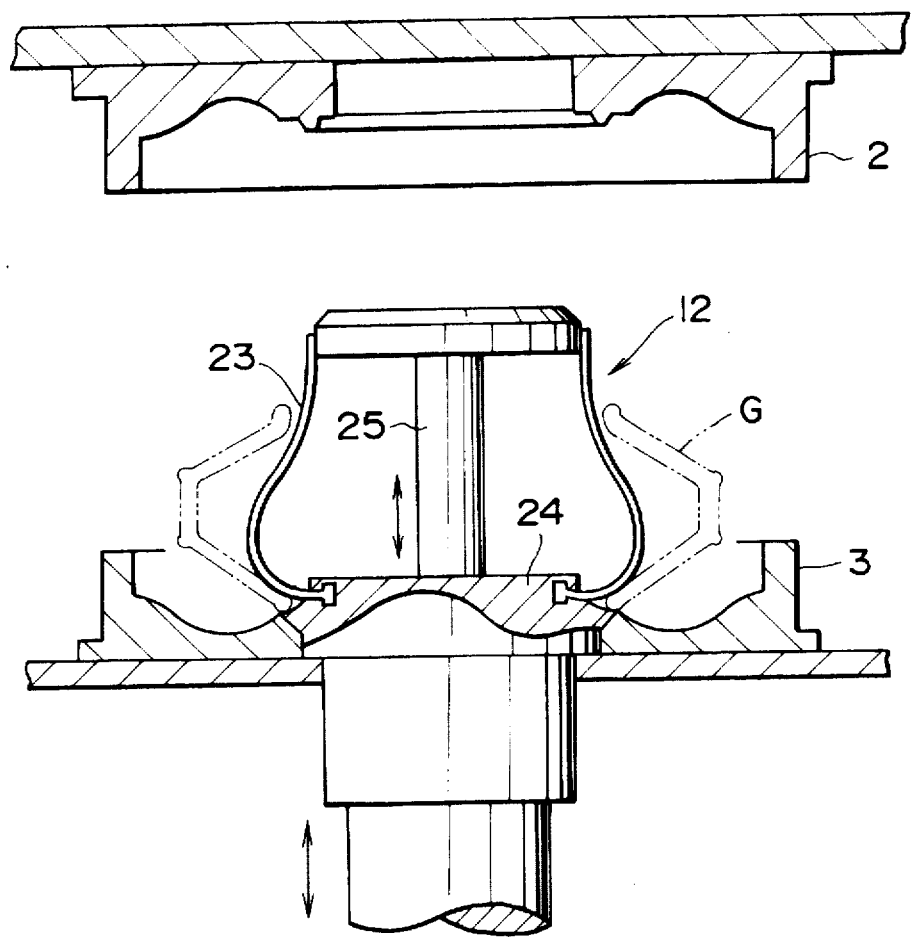
FIG. 2 is a side elevation view (enlarged main portion of FIG. 1) in which a bladder is shown enlargedly.

As shown in FIG. 2, the upper-half mold 2 and the lower-half mold 3 are closed so as to construct therein a tire-shaped vulcanization cavity. The closed mold can be opened, or can be kept closed by rotating a retaining ring (not shown) which surrounds the outer peripheries of the upper-half mold 2 and the lower-half mold 3 by a fluid pressure drive device or the like.

A center mechanism 12, which will be described hereinlater, is provided in the center of the lower-half mold 3.

In FIG. 1, each of the upper heating unit 5 and the lower heating unit 7 has a structure into which a heating medium such as steam can be flowed in order to heat the upper-half mold 2 or the lower half mold 3. Reference numeral 13 and 14 denote piping through which the heating medium is supplied and discharged.

The upper heating unit 5 has a cylinder structure comprising a heating medium receiving member 17 and a movable heat transfer member 18 which is movable in the vertical direction and is held under the heating medium receiving member 17.

When the heating medium is supplied to the heating medium receiving member 17, the movable heat transfer member 18 is pressed downwardly from the heating medium receiving member 17. Consequently, a pressure force, that is a clamping force, is acted from the upper-half mold 2 to the lower-half mold 3.

When the heating medium is discharged from the heat medium receiving member 17, the movable heat transfer member 18 is held free (for example, when the movable heat transfer member 18 is pushed up, it returns to the heating medium receiving member 17).

As mentioned above, the upper heating unit 5 has two actions; the heating of the upper-half mold 2 via the movable heat transfer member 18, and the clamping of the mold.

In the upper heating unit 5, the movable heat transfer member 18 can be set as follows. When the upper-half mold 2 and the lower-half mold 3 are closed, the movable heat transfer member 18 comes into contact with the upper-half mold 2. The movable heat transfer member 18 is prevented from projecting from the heating medium receiving member 17 (i.e., that is the limit of the stroke). In this case, therefore, the movable heat transfer member 18 does not press the upper-half mold 2 downward even when the heating medium is supplied to the heating medium receiving member 17. In other words, when the upper-half mold 2 is opened from the lower-half mold 3, the pressure in the closing direction acts to prevent the opening.

Thus, although the small vertical stroke of the movable heat transfer member 15 is sufficient to close the molds, it is desirable to have a little play. When excessive pressure is applied on the upper mold 2, a reaction of lifting the top slide 6 takes place. In the worse case, deformation (bending, positional deviation, or the like) of any component may be caused.

It is, therefore, preferable that a clamping force holding pillar 20 is placed between the base frame 8 and the top slide 6 in order to limit the excessive stroke.

Preferably, the vertical stroke of the movable heat transfer member 18 is adjusted by expansion and contraction of the clamping force holds pillar 20 itself, or by the change of the clamping force holding pillars 20 to those having different length.

The lower end of the clamping force holding pillar 20 is connected via a damper section 21 to the base frame 8. When the mold opening/closing mechanism 10 is operated to vertically move the top slide 6, the damper section 21 and the base frame 8 are either manually or automatically detached.

There are various upper molds 2 and lower molds 3 of different height which are used for the tire press 1 in association with sizes of tires which are manufactured. Since the amount of the vertical movement of the movable heat transfer member 18 can be adjusted by the adjustment of the amount of the heating medium which is supplied to the heating medium receiving member 17 of the upper heating unit 5 (such as adjustment is needed when the stroke of the clamping force holding pillar 20 is insufficient), then even if the upper-half mold 2 or the lower-half mold 3 is replaced by that of a different height, it is obviously understood that the height adjustment for the clamping is unnecessary.

In addition, the vertical length of the stroke of the movable heat transfer member 18 is set to be larger than the height of the mold when the highest upper-half mold 2 and the highest lower-half mold 3 of the various upper-half and lower-half molds are closed. Thus, there is an advantage that the adjustments of the mold height in the lower heating unit 7, the vertical stroke of the mold opening/closing mechanism 10, and the like are unnecessary.

As shown in FIG. 2, the center mechanism 12 has: a bag-shaped bladder 23 made of an elastic medium such as rubber; an elevating base 24 for supporting the bladder 23; a vertically-moving axis 25 whose upper end is connected to the inner face of the ceiling of the bladder 28, and which is provided in order to penetrate the elevating base 24; and a fluid source (not shown) from/to which a pressure fluid (steam or the like) at high temperature is supplied/returned to/from the bladder 23.

The vertically-moving axis 25 can move by either the fluid pressure cylinder, an electric-powered ball screw mechanism (not shown), or the like. When the axis 25 is moved upward, the bladder 23 becomes narrow and elongated, the green tire G can be loaded or the vulcanized tire can be unloaded. When the axis 25 is moved downward, the bladder 23 becomes wide and flat and presents a predetermined shape (shape which comes into contact with the almost entire inner face of the green tire G).

The elevating base 24 is also elevated by either the fluid pressure cylinder, the electric-powered ball screw mechanism (not shown), or the like, which is provided separately from the vertically-moving axis 25, and which constructs a knock-out mechanism that makes the unloading of the vulcanized tire easy.

In the center mechanism 12, the bladder 23 becomes wide and flat as the vertically-moving axis 25 moves downward, and is filled with the high-temperature pressure fluid that is flowed from the fluid source. Reference numerals 27 and 28 shown in FIG. 1 denote piping for this purpose. Thus, the inside of the green tire G can be also heated while keeping the green tire G in the predetermined shape.

A branch 29 is provided in the middle of the piping 27 and 28 extending from the fluid source to the bladder 23. The piping 13 and 14 for supplying and discharging the heating medium to/from the upper heating unit 5 and the lower heating unit 7 are connected to the branch 29.

In the upper heating unit 5 mentioned above, the heating medium that is supplied to the heating medium receiving member 17 is supplied from a branch of the fluid source from which pressure fluid is supplied to the bladder 23. Therefore, fluid source, piping, valve controller, and the like which are exclusively used to operate the upper heating unit 5 are unnecessary.

The invention is not limited to the above embodiment.

For example, in place of the upper heating unit 5, the lower heating unit 7 (or both of heating units 5 and 7) can also have the heating medium receiving member 17 and the movable heat transfer member 18.

The mold opening/closing mechanism 10 is not limited to the one that uses the fluid pressure cylinder. A mechanical mechanism such as a crank mechanism, a ball screw mechanism, or the like can be also used.

The heating medium used for the upper heating unit 5 or the lower heating unit 7 and the pressure fluid used for bladder 23 are not limited to steam, but fluid obtained by pressurizing and heating liquid such as water, oil, or the like can be also used.

As obviously understood from the above description, in the tire press according to the invention, at least one of the heating units has the heating medium receiving member and the movable heat transfer member which presses the upper-half or lower-half mold in order to keep them closed. When a heating medium such as steam is supplied to the heating medium receiving member, not only the upper-half or lower-half mod is held, but also the movable heat transfer member is pressed to be projected from the heating medium receiving member (that is, in the clamping direction of the mold). By using the pressure force, the mold can be evenly closed.

When the green tire is vulcanized, the bladder is loaded into it, and it is then expanded by the high-temperature pressure fluid. When the heating medium is supplied from a branch of the source of the pressure fluid from which the fluid is supplied to the movable heat transfer member, the fluid source, piping, and the like which are exclusively used for the heating unit become unnecessary. Thus, the structure of the tire press can be further simplified.

In the heating unit having the movable heat transfer member, when the movable heat transfer member has vertical stroke length which permits a change in the height of the mold with respect to the heating medium receiving member, it is unnecessary to provide the mechanism of adjusting the height of the mold. Hence, a structure is further simplified.

When the upper-half and lower-half molds are replaced by those having different height, the height can be adjusted in a short time (as it is sufficient to change the amount of heating medium that is supplied to the heating medium receiving member), so that working time can be shortened.

When the upper heating unit is used as a heating unit having the movable heat transfer member, since no interference occurs to the bladder or the like, it is very advantageous to prevent the complication of the structure.

What is claimed is:

1. A tire press comprising:
    a mold having an upper-half mold and a lower-half mold that forms therein a cavity, in which a green tire is vulcanized, when the mold is closed;
    a mechanism which lifts up the upper-half mold to open the mold and joins the upper-half mold to the lower-half mold to close the mold;
    an upper heating unit which comes into contact with the upper-half mold after the mold has been closed; and
    a lower heating unit which comes into contact with the lower-half mold after the mold has been closed,
    wherein the upper heating unit or the lower heating unit has a heating medium receiving member and a movable heat transfer member which is connected to the heating medium receiving member so as to receive heat therefrom and move therewith, and to press the upper-half or lower-half mold to clamp the closed mold.

2. The tire press according to claim 1, wherein a heating medium supply source comprises means for distributing the heating medium by pressure to both a bladder for expanding the green tire and the heating medium receiving member of the heating unit having the movable heat transfer member.

3. The tire press according to claim 1 or 2, wherein in the heating unit having the movable heat transfer member, the movable heat transfer member is vertically movable with respect to the heating medium receiving member by a stroke permitting a change in the height of the mold.

4. The tire press according to any one of claims 1 or 2, wherein the upper heating unit is the heating unit having the movable heat transfer member.

* * * * *